US007979700B2

(12) United States Patent
Elazar et al.

(10) Patent No.: US 7,979,700 B2
(45) Date of Patent: Jul. 12, 2011

(54) APPARATUS, SYSTEM AND METHOD FOR SECURING DIGITAL DOCUMENTS IN A DIGITAL APPLIANCE

(75) Inventors: Gidon Elazar, Tsur-Yigal (IL); Dan Harkabi, Moshav Lachish (IL); Nehemiah Weingarten, Ramat-Gan (IL)

(73) Assignee: SanDisk Corporation, Milpitas, CA (US)

( * ) Notice: Subject to any disclaimer, the term of this patent is extended or adjusted under 35 U.S.C. 154(b) by 903 days.

(21) Appl. No.: 11/067,298

(22) Filed: Feb. 25, 2005

(65) Prior Publication Data

US 2006/0080535 A1   Apr. 13, 2006

Related U.S. Application Data

(63) Continuation-in-part of application No. 10/227,155, filed on Aug. 23, 2002, now abandoned.

(51) Int. Cl.
| | |
|---|---|
| G06F 9/00 | (2006.01) |
| G06F 7/04 | (2006.01) |
| G06F 17/30 | (2006.01) |
| H04L 29/06 | (2006.01) |
| H04N 7/173 | (2011.01) |
| H04N 5/46 | (2006.01) |

(52) U.S. Cl. ............... 713/165; 713/1; 713/155; 726/2; 726/27; 725/105; 348/558

(58) Field of Classification Search .............. 726/26, 726/2, 27; 709/226; 713/1, 155, 165; 725/105; 348/231
See application file for complete search history.

(56) References Cited

U.S. PATENT DOCUMENTS 4,634,807 A   1/1987   Chorley et al.
(Continued)

FOREIGN PATENT DOCUMENTS

DE       19820479 A1   12/1999
(Continued)

OTHER PUBLICATIONS

Humer, Caroline, "Students Set to Hit the Latest E-Books," http://msnbc.com/id/4846005/, Apr. 27, 2004, 5 pages.
(Continued)

*Primary Examiner* — Nasser Moazzami
*Assistant Examiner* — Mohammad W Reza
(74) *Attorney, Agent, or Firm* — Brinks Hofer Gilson & Lione

(57) ABSTRACT

Various embodiments include an apparatus and a method to secure protected digital document content from tampering by their user, such as unauthenticated use or use violating a policy of the digital document. The digital document file can be transferred from a network node such as a web site server to a digital appliance, such as a computer, in encrypted form. The digital document file can be resident already on a device, and/or be transferred into a device that is connected to the digital appliance. The device (hereafter a DRM device) can internally store the digital document or part of the document. The DRM device may decrypt the digital document when requested to do so. The device may further format the content for usage, for example, convert text into its graphic bitmap representation. Device formatting can include sending plain text data to the digital appliance. The device may further process degradation to the resulted file, for example, reduce the resolution of the graphic representation. The digital appliance uploads the result of the processing or sections of the result of the processing for user access via the digital appliance.

42 Claims, 4 Drawing Sheets

U.S. PATENT DOCUMENTS

| | | | |
|---|---|---|---|
| 4,757,302 A | | 7/1988 | Hatakeyama et al. |
| 5,446,896 A | * | 8/1995 | Hegarty et al. ............ 707/1 |
| 5,450,489 A | | 9/1995 | Ostrover et al. |
| 5,530,235 A | | 6/1996 | Stefik et al. |
| 5,715,403 A | | 2/1998 | Stefik |
| 5,825,879 A | | 10/1998 | Davis |
| 5,847,698 A | | 12/1998 | Reavey et al. |
| 5,887,269 A | | 3/1999 | Brunts et al. |
| 5,956,034 A | * | 9/1999 | Sachs et al. ............ 715/776 |
| 5,982,891 A | | 11/1999 | Ginter et al. |
| 5,991,399 A | | 11/1999 | Graunke et al. |
| 6,009,525 A | | 12/1999 | Horstmann |
| 6,022,223 A | | 2/2000 | Taniguchi et al. |
| 6,055,314 A | | 4/2000 | Spies et al. |
| 6,118,116 A | * | 9/2000 | Sawada et al. ............ 250/208.1 |
| 6,226,618 B1 | | 5/2001 | Downs et al. |
| 6,314,409 B2 | | 11/2001 | Schneck et al. |
| 6,351,547 B1 | * | 2/2002 | Johnson et al. ............ 382/128 |
| 6,418,421 B1 | | 7/2002 | Hurtado et al. |
| 6,529,949 B1 | | 3/2003 | Getsin et al. |
| 6,546,193 B1 | | 4/2003 | Um et al. |
| 6,550,011 B1 | | 4/2003 | Sims |
| 6,598,164 B1 | | 7/2003 | Shepard |
| 6,611,358 B1 | | 8/2003 | Narayanaswamy |
| 6,636,773 B1 | | 10/2003 | Tagawa et al. |
| 6,697,944 B1 | | 2/2004 | Jones et al. |
| 6,732,275 B1 | | 5/2004 | Dimenstein |
| 6,738,614 B1 | | 5/2004 | Blankenship et al. |
| 6,738,905 B1 | | 5/2004 | Kravitz et al. |
| 6,757,749 B2 | | 6/2004 | Aoki et al. |
| 6,824,051 B2 | | 11/2004 | Reddy et al. |
| 6,876,984 B2 | | 4/2005 | Tadayon et al. |
| 6,886,036 B1 | | 4/2005 | Santamaki et al. |
| 6,907,585 B2 | * | 6/2005 | Kohno ............ 716/4 |
| 6,922,725 B2 | * | 7/2005 | Lamming et al. ............ 709/227 |
| 6,944,600 B2 | | 9/2005 | Stefik et al. |
| 6,973,445 B2 | | 12/2005 | Tadayon et al. |
| 6,974,076 B1 | | 12/2005 | Siegel |
| 6,983,367 B2 | | 1/2006 | Go et al. |
| 7,023,572 B2 | | 4/2006 | Tuli |
| 7,058,818 B2 | | 6/2006 | Dariel |
| 7,068,381 B1 | | 6/2006 | Tuli |
| 7,068,387 B2 | * | 6/2006 | Ahne et al. ............ 358/1.15 |
| 7,213,004 B2 | | 5/2007 | Hars et al |
| 7,225,340 B2 | | 5/2007 | Asahi et al. |
| 7,249,105 B1 | | 7/2007 | Peinado et al. |
| 7,257,309 B1 | | 8/2007 | Elswick et al. |
| 7,296,098 B2 | | 11/2007 | Shih |
| 7,313,814 B2 | | 12/2007 | Zhu et al. |
| 7,350,228 B2 | | 3/2008 | Peled et al. |
| 7,483,168 B2 | * | 1/2009 | Kuwata et al. ............ 358/1.9 |
| 2001/0013021 A1 | | 8/2001 | Saito |
| 2002/0026424 A1 | | 2/2002 | Akashi |
| 2002/0099955 A1 | | 7/2002 | Peled et al. |
| 2002/0112172 A1 | | 8/2002 | Simmons |
| 2002/0141499 A1 | | 10/2002 | Goertzen |
| 2002/0152172 A1 | | 10/2002 | Hars et al. |
| 2002/0176575 A1 | | 11/2002 | Qawami et al. |
| 2002/0184156 A1 | | 12/2002 | Tadayon et al. |
| 2002/0186842 A1 | | 12/2002 | Sabet-Sharghi et al. |
| 2002/0196364 A1 | | 12/2002 | Hendricks |
| 2003/0018582 A1 | | 1/2003 | Yaacovi |
| 2003/0167236 A1 | | 9/2003 | Stefik et al. |
| 2003/0225701 A1 | | 12/2003 | Lee et al. |
| 2004/0010467 A1 | | 1/2004 | Hori et al. |
| 2004/0039932 A1 | | 2/2004 | Elazar et al. |
| 2004/0136536 A1 | | 7/2004 | Michtchenko |
| 2004/0137664 A1 | | 7/2004 | Elazar et al. |
| 2004/0193744 A1 | | 9/2004 | Paley et al. |
| 2004/0205453 A1 | | 10/2004 | Mortensen |
| 2005/0004875 A1 | | 1/2005 | Kontio et al. |
| 2005/0044330 A1 | | 2/2005 | Elazar et al. |
| 2005/0061873 A1 | | 3/2005 | Pirillo |
| 2005/0149450 A1 | | 7/2005 | Stefik et al. |
| 2005/0230483 A1 | | 10/2005 | Miller et al. |
| 2005/0230484 A1 | | 10/2005 | Cuellar et al. |
| 2005/0289072 A1 | | 12/2005 | Sabharwal |
| 2006/0010500 A1 | | 1/2006 | Elazar et al. |
| 2006/0084287 A1 | | 4/2006 | Miller et al. |
| 2006/0253620 A1 | | 11/2006 | Kang |
| 2007/0027814 A1 | | 2/2007 | Tuoriniemi |
| 2007/0198430 A1 | | 8/2007 | Takahashi |
| 2007/0265977 A1 | | 11/2007 | Read |

FOREIGN PATENT DOCUMENTS

| | | |
|---|---|---|
| EP | 1304665 A2 | 4/2003 |
| EP | 1 376 309 A | 1/2004 |
| GB | 2367925 A | 4/2002 |
| WO | 98/42098 A1 | 9/1998 |
| WO | WO 01/ 13199 A1 | 2/2001 |
| WO | WO 01/23980 A1 | 4/2001 |
| WO | WO 01/69354 A2 | 9/2001 |
| WO | WO 01/69354 A3 | 9/2001 |
| WO | WO 01/69354 A4 | 9/2001 |
| WO | 01/93000 A2 | 12/2001 |
| WO | WO 03/036975 | 5/2003 |
| WO | WO 2004/086363 A2 | 10/2004 |
| WO | WO 2006/110213 A2 | 10/2006 |

OTHER PUBLICATIONS

SanDisk Secure Content Solutions, Inc., "BookLocker™ Secure Digital Books," Product Description, 2005, 4 pages.

Edited by Bill Cope and Robin Freeman, "Digital Rights Management and Content Development: Technology Drivers Across the Book Production Chain, from Creator to Consumer," RMIT University, 2001, whole book (pp. v.-166).

Lesley Ellen Harris, "Digital Property Currency of the $21^{st}$ Century," published McGraw-Hill Ryerson Ltd, 1998, whole book (pp. vi-230).

National Research Council, "The Digital Dilemma, Intellectual Property Rights and the Emerging Information Infrastructure," National Academy Press, Washington D.C., 2000, whole book (pp. v-340).

Lawrence Lessig, "The Future of Ideas," Random House 2001, whole book (pp. vii-352).

Carol Risher, "Technological Protection Measures (Anti-Circumvention Devices) and Their Relation to Exceptions to Copyright in the Electronic Environment," http://www.ipa-uie.org/events/bookfairs/fbf2000/crisher.html, Oct. 20, 2000, 6 pages.

Mike Godwin, "A Cop in Every Computer," IP Worldwide, http://www.law.com, Jan. 14, 2002, 5 pages.

Mark Walter et al., "DRM: 'Down-Right Messy' and Getting Worse," The Seybold Report, Analyzing Publishing Technologies, vol. 1, No. 3, pp. 5-15.

Renato Iannella, "Digital Rights Management (DRM) Architectures," D-Lib Magazine, vol. 7, No. 6, Jun. 2001, 10 pages.

Joshua Duhl et al., "Understanding DRM Systems—An IDC Whitepaper," www.idc.com, pp. 1-25.

Patricia Evans, "DRM: Is the Road to Adoption Fraught With Potholes?" The Seybold Report, vol. 1, No. 14, Oct. 22, 2001, pp. 1-3.

Richard Eoin Nash, "A Tale of Two E-media Hosts," http://www.hostingtech.com/sp/02_06_sp_tale_print.html, Jun. 2002, pp. 1-3.

Dennis Fowler, "Digital Rights (and Wrongs)," NW, Jun. 2002, pp. 26-31.

Bill Pearson, Technical Marketing Engineer, "Digital Transmission Content Protection," presented Jun. 16, 1999 at Intel Corporation, pp. 1-25.

Jaehong Park et al., "Towards Usage Control Models: Beyond Traditional Access Control," SACMAT'02, Jun. 3-4, 2002, Monterey, CA, pp. 57-64.

Ingemar J. Cox, "Watermarking and Digital Rights Management," NEC Research Institute, Princeton, NJ, Mar. 20, 2001, pp. 1-14.

Eric Knorr, "Content Rights and Wrongs," http://Techupdate.zdnet.com, Dec. 4, 2001, pp. 1-2. Tech Update, Dec. 4, 2001, pp. 1-2.

Mark Stamp, "Digital Rights Management: The Technology Behind the Hype (Draft)," Jun. 6, 2002, pp. 1-15.

Bill Trippe, "XrML and Emerging Models of Content Development and Distribution," The Gilbane Report, Apr. 23, 2002, pp. 1-16.

Mark Walter, "Authentica, Alchemedia Apply DRM to Corporate Intellectual Property," The Seybold Report, vol. 1, No. 12, Sep. 17, 2001, pp. 1-4.

Nic Garnett, "Digital Rights Management, Copyright, and Napster," Jun. 2001, pp. 1-5.

Nic Garnett and Tomas Sander, "Fair Use by Design—Session 3: What DRM can and cannot do and what it is or isn't doing today," 12$^{th}$ Conference on Computers, Freedom & Privacy, San Francisco, Apr. 16-19, 2002, 6 pages.

Joshua Duhl, "Sony Licenses InterTrust's DRM: What Does It Mean?" IDCFlash, Jun. 2002, pp. 1-4.

Dr. John Manferdelli, "Digital Rights Management("DRM")" Unified DRM Group, Microsoft Corporation, Symposium on Embedded Security, 2001, pp. 1-26.

Martha Nalebuff, "Publisher's Dilemma," Unified DRM Core at Microsoft Corporation, Seybold, Apr. 10, 2001, pp. 1-6.

Amy Carroll et al., "Microsoft Palladium: A Business Overview," Microsoft Content Security Business Unit, Jun. 2002, pp. 1-9.

Gordon Lyon, "The Internet Marketplace and DRM,"Convergent Information Systems Division, NIST, Jul. 12, 2001, pp. 1-12.

Michael Calvert, "Content Management—Timetable for Digital Rights Management," InSide Gartner This Week, No. 2, Jul. 18, 2001, pp. 1-3.

Kim Zwollo, "Digital Document Delivery and Digital Rights Management," IOS Press, 2001, pp. 9-11.

Olin Sibert, "Digital Rights Management: The Future Is Secure Hardware," Electronic Design, vol. 48, i10, May 15, 2000, p. 56.

Info-Tech Advisor Newsletter, "Digital Rights Management 101," Jun. 26, 2001, pp. 1-2.

"Fair Usage Definition Called Key to Digital Rights Management," Communications Daily, v 22, i25, Feb. 6, 2002, pp. 1-2.

"Lack of DRM Standards Impeding Broadband Demand," Audio Week, v. 13, i51, Dec. 24, 2001, pp. 1-2.

Linden deCarmo, Media Alert—New Digital Rights Technologies Protect Content Creators' Interests, But What About Users' Rights? PC Magazine, Jun. 26, 2001, pp. 1-5, 80.

Harvey Ardman, "Will DRM Make Digital Publishing More Profitable?" Seybold Seminars, Boston, Apr. 2001, pp. 1-2.

Susan Marks, "Staking Out Digital Rights; Digital Rights Management Software Addresses the Thorny E-Comm Problem of Sharing Content While Protecting Intellectual Property," Network World, Feb. 18, 2002, pp. 1-2, 70.

Robert Bolick, "Pricing Digital Content," Professional Book Group, The McGraw-Hill Companies, Mar. 11, 2001, pp. 1-8.

Yuval Levin, "Talking to ourselves," Liberzine.com, Sep. 6, 2000, pp. 1-3.

Clifford Lynch, "The Battle to Define the Future of the Book in the Digital World," First Monday, May 2001, pp. 1-49.

Richard Stallman, "The Right to Read," GNU Project—Free Software Foundation (FSF), Feb. 1997, pp. 1-5.

"The Digital Millennium Copyright Act of 1998," (DMCA) Pub. L. No. 105-304, 112 Stat. 2860, Dec. 1998, pp. 1-18.

"Doesn't Everybody Do It?—Internet Piracy Attitudes and Behaviors," A report on a survey conducted by SIIA and KPMG—Fall 2001, pp. 1-32.

"IIPA 2000-2001 Estimated Trade Losses Due To Copyright Piracy," International Intellectual Property Alliance (IIPA), Apr. 30, 2002, pp. 1-2.

Ipsos-NPD, "Briefing: The Online Book Marketplace," May 2001, 33 pages.

Terje Hillesund, "Will E-books Change the World?" First Monday, Sep. 14, 2001, pp. 1-21.

George Alexander et al., "The Road Ahead: Problems Facing the Publishing Industry Today," The Seybold Report, Apr. 22, 2002, vol. 2, No. 2, pp. 3-9.

John Markoff, "Fears of Misuse of Encryption System Are Voiced," New York Times, Jun. 20, 2002, pp. 1-3.

"Trusted Computing Platform Alliance (TCPA)," TCPA Design Philosophies and Concepts, Version 1.0, Copyright 2000 Compaq Computer Corporation, Hewlett-Packard Company, IBM Corporation, Intel Corporation, Microsoft Corporation, Jan. 25, 2001, V. 1.0 25, pp. 1-30.

Joshua Piven, "Tech vs. Tinseltown," Computer Technology Review, Los Angeles, May 2002, pp. 1-4.

"The Need for a Rights Language," Technical White Paper, Version 1.0, ContentGuard 2001, pp. 1-12.

"Extensible Rights Markup Language (XrML) 2.0 Specification," Part 1-Part V, ContentGuard, Nov. 20, 2001, 154 pages.

"Digital Rights Management for Ebooks: Publisher Requirements," Version 1.0, Association of American Publishers (AAP), Nov. 27, 2000, pp. 1-66.

USB Implementers Forum, "Universal Serial Bus Mass Storage Class, UFI Command Specification," Revision 1.0, Dec. 14, 1998, pp. 1-53.

European Patent Office, "Office Action," mailed in European patent Application No. 03 793 121.9 on Jun. 21, 2006, 8 pages.

Notification of Transmittal of the International Search Report and the Written Opinion of the International Searching Authority, or the Declaration for International Application No. PCT/US2006/005687 for SanDisk Corporation mailed Aug. 16, 2006, 10 pages.

EPO, "Office Action," corresponding European Patent Application No. 03 793 121.9 on Aug. 28, 2007, 5 pages.

The Patent Office of the People's Republic of China, "Office Action," mailed in related Chinese Patent Application No. 03820015.5 on Jun. 1, 2007, 12 pages (including translation).

USPTO, "Office Action," mailed in U.S. Appl. No. 10/227,155 on Sep. 28, 2007, 8 pages.

USPTO, "Office Action," mailed in U.S. Appl. No. 10/227,155 on Jan. 3, 2008, 9 pages.

Office Action for U.S. Appl. No. 10/227,155, mailed Feb. 15, 2007, 13 pages.

Comer, Douglas et al., "Operating System Design vol. 1: The Xinu Approach," Englewood Cliffs, New Jersey, Prentice Hall, 1989, pp. 308-309.

Kim, Won et al., "Object-Oriented Concepts, Databases, and Applications," New York, New York: ACM Press, 1989, ISBN 0-201-14410-7, pp. 4-5.

PCT International Search Report mailed Mar. 19, 2004, International Application No. PCT/US03/25921 mailed Mar. 19, 2004, 4 pages.

Office Action for U.S. Appl. No. 10/227,155 mailed Jan. 27, 2006, 12 pages.

"Sandisk BookLocker aka FlashCP DRM/Based USB Stick," Colin Dunstan & Flauzon, Internet Article, Jun. 29, 2005, 1 page.

"BookLocker," SanDisk, Internet Article, Feb. 6, 2005, XP002484733, 1 page.

"Sandisk Frees Students from Heavy Backpacks," Press Release (Online), Jun. 28, 2005, 1 page.

"Sandisk Introduces Ultra II SD Plus, a Dual-Purpose SD Memory Card with Built-In USB Connectivity," Press Release (Online), Feb. 19, 2005, XP002484735, 1 page.

Final Office Action for U.S. Appl. No. 10/227,155 mailed Jul. 18, 2008, 13 pages.

Notification of Reasons for Refusal, Japanese Application No. 2004-531076, Dec. 23, 2009, 7 pages.

Second Office Action of Chinese Patent Application No. 03820015,5 dated Nov. 30, 2009, 13 pages.

Office Action for U.S. Appl. No. 10/227,155 mailed Feb. 10, 2009, 19 pages.

Office Action for U.S. Appl. No. 10/227,155 mailed Sep. 8, 2009, 15 pages.

Notice of Preliminary Rejection Office Action for Korean Patent Application No. 2005-7003098 dated Oct. 14, 2009, 4 pages.

* cited by examiner

APPARATUS, SYSTEM AND METHOD FOR SECURING DIGITAL DOCUMENTS IN A DIGITAL APPLIANCE

CROSS-REFERENCE TO RELATED APPLICATIONS

This application is a continuation in part of patent application Ser. No. 10/227,155, filed Aug. 23, 2002, now abandoned and published under no. 2004/0039932A1 on Feb. 26, 2004, which is incorporated herein in its entirety by this reference for all purposes.

FIELD OF THE INVENTION

This invention generally relates to digital rights management. More particularly this invention relates to methods of securing digital documents to be used in a digital appliance such as a personal computer.

BACKGROUND OF THE INVENTION

The Internet worldwide network enables many digital appliances to interconnect and exchange information. A particular use of the Internet is to distribute digital files, specifically digital content such as digital books or music files, to the connected appliances.

The proliferation and distribution of digital music files is substantial. Various devices, programs and methods to listen to digital music are available, and an increasing number of music title exists in digital form. Unfortunately there exists a substantial amount of illegal copies of digital music files, such that the rights of the owner of the music cannot be exercised with respect to the illegal copies.

Digital books are substantially less popular and common than music. One of the reasons for the difference between the proliferation of music in digital form and books in digital form is the caution felt by book content rights owners against potential copyright infringement, a lesson learned from the experience of the music industry. Concerns about losing control over the management of rights prevents the usage of the Internet as a powerful digital content distribution infrastructure.

Digital rights management (DRM) systems are developed to challenge the above difficulties. Part of the function of a typical DRM system is to define the form of "rights-protected files"—methods that enable the use of digital files under limitations defined by the owner of the rights to the content. These systems typically involve cryptographic methods for the secure distribution of the content between a content repository or server and a digital appliance. Such methods typically require the appliance to include an implementation of cryptographic algorithms and hold cryptographic keys in order to gain access to the content. The access to the content is performed through a program that is DRM sensitive and is hereafter called—an electronic book reader.

Examples of electronic book reading software are the Adobe Acrobat, Adobe eBook Reader (http://www.adobe.com) and the Microsoft eBook Reader (http://www.microsoft.com/reader). Such software implements some form of DRM that is engaged when the users attempts to open and view a digital document. One of the operations performed by such electronic book readers is the process of decrypting the document using cryptographic methods and cryptographic keys. In order to do so, the reader program must have access to the cryptographic methods and keys; therefore the cryptographic methods and keys must reside within the access of the reader program. Typically the cryptographic methods, the keys, or both reside within the reader program, on the document itself, or somewhere within the appliance storage.

A digital appliance such as a computer is typically an open platform enabling computer programmers to develop programs. In some cases, software programs are developed for the purpose of hacking and locating the cryptographic keys and algorithms of a DRM system (hereafter referred to as hacking programs), in order to circumvent the DRM and gain illegal access to the content. This process is generally called an "attack" and if it succeeds it is commonly referred to as to "crack" the DRM system. A computer program that performs this function is referred hereafter as a hacking program.

Examples for such successful attacks are well known in the art. In late 2001, a programmer was able to crack the Microsoft eBook reader and locate the cryptographic methods and keys, producing a program that inputs an encrypted eBook file and outputs an illegal electronic book that is not protected (http://www.technologyreview.com/articles/innovation11101.asp). A similar cracking event of the Adobe system took place earlier that year (http://www.wired.com/news/politics/0,1283,45298,00.html).

Other forms of attacks include using programming tools. For example, software debuggers track and trap the electronic book information after the electronic book reader has decrypted it, retrieving the "protected" information. Such information includes the book text, images and attributes such as fonts, text color, and image locations, etc., which instruct the electronic book reader on how it should reconstruct the book for presentation to the user. A hacking program that cracks the reader and releases this information from the DRM system enables the construction of illegal copies of the original electronic book.

As a countermeasure, DRM systems have used more sophisticated cryptographic schemes and code obfuscation techniques. Other methods include adding tamper resistant hardware to store the cryptographic keys. Examples of such methods are cryptographic tokens such as iToken of Rainbow Technologies Inc. (http://www.rainbow.com/ikey/index.html) and using a smart card to store cryptographic keys and optionally cryptographic algorithms. Such solutions either reveal the cryptographic key to the digital appliance in the process of decrypting the information, or internally perform the cryptographic functions but reveal the end result in a raw form that can be hacked. In practice these methods were proven to slow, but not halt, an adversary. Given enough time and effort a computer program that "cracks" the DRM system may be written. It can be appreciated by those skilled in the art that such successful attacks may occur to such program readers that execute in an open environment that enables programmers to develop software programs. Similarly, cryptographic co-processors leave the content vulnerable after decryption.

Several ongoing initiatives focus on securing the personal computer itself. As result, a major effort is being taken by the industry, led by companies such as Microsoft to protect some part of a personal computer by transforming that part into a closed system.(http://www.microsoft.com/presspass/features/2002/jul02/0724palladiumwp.asp). This initiative may produce a personal computer that is less sensitive to viruses, can be identified by service providers over the network, and can be used to build a DRM system. Microsoft's Palladium defines how to make the operating system of the personal computer secure. Once the operating system is secure, the PC is considered trusted and it can be used for purposes such as DRM. The Wave Embassy verification system secures an appliance. Unfortunately these initiatives will be realized only in future digital appliances, which must incorporate technology specific to Palladium and Wave Embassy for securing the personal computer itself.

There is clearly an unmet need for a system, method and device for securing digital documents in a digital appliance.

SUMMARY OF THE INVENTION

The above-mentioned disadvantages and problems are addressed by the present invention, which will be understood by reading the following specification. To protect the cryptographic keys and cryptographic methods from being located within a digital appliance, according to the present invention the keys and methods are stored and executed in a dedicated DRM device that has processing capability distinct from the digital appliance, and does not provide an open environment for at least some security functions of the DRM device for programmers to develop programs. In some embodiments, another party may develop additional functions.

According to some embodiments, a digital document file or a section of the digital document that is protected is downloaded from an Internet server to the DRM device through a digital appliance. According to other embodiments, the digital document is already resident in the DRM device. Once the document is internal to the device, several processes may take place.

In some embodiments, if the document is in an encrypted form it is processed through a decryptor to produce a decrypted form. A decrypted digital document can be processed by a formatter internal to the DRM device to produce a formatted form of the digital document or the section of the digital document, such as, but not limited to, a bitmap image of a page of the document. Other examples of formatting include passing plain text to the digital appliance.

The DRM device can further process policies such as allowing or disallowing a formatted form of the document to be transferred to the digital appliance, for example in order to be presented to the user. The policy may be based on rights of use, time, number of usage events and so on.

Some embodiments involve end use of digital documents. Other embodiments involve end use of music data and/or video data.

BRIEF DESCRIPTION OF THE DRAWINGS

The foregoing and other objects, aspects and advantages will be better understood from the following detailed description of an embodiment of the invention with reference to the drawings, wherein.

DETAILED DESCRIPTION OF THE INVENTION

In the following detailed description of exemplary embodiments of the invention, reference is made to the drawings that illustrate specific exemplary embodiments in which the invention may be practiced. Those skilled in the art will appreciate that other embodiments may be utilized without departing from the spirit of the present invention, therefore the following detailed description of the invention should not be taken in a limiting sense. The scope of the invention is defined only by the appended claims.

Figure 1:
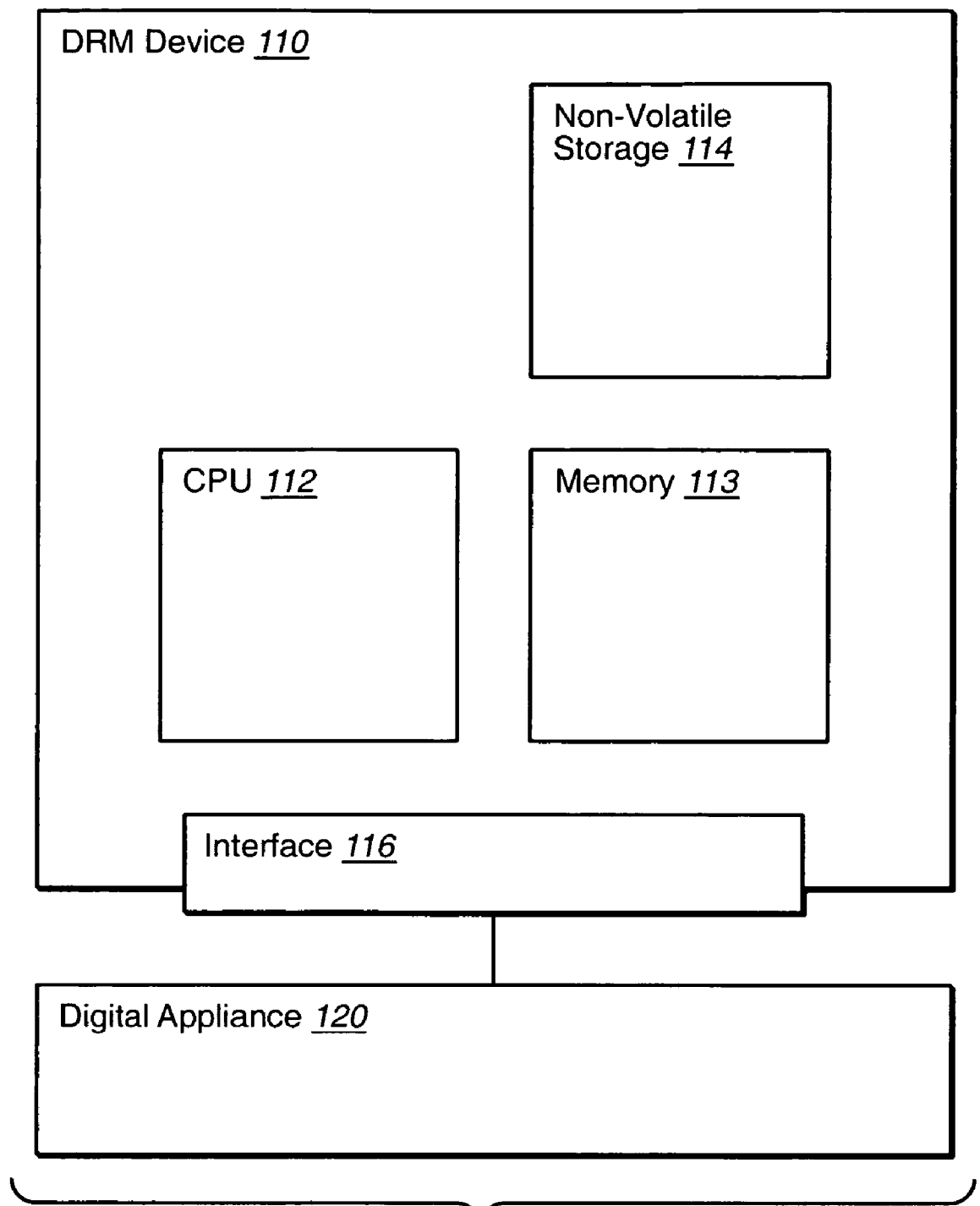
FIG. 1 is a schematic block diagram of an embodiment of the DRM device.

FIG. 1 is a diagram of an exemplary embodiment of the DRM device hardware 110, which includes a central processing unit (CPU) 112, an optional system memory 113, non-volatile storage 114, and an interface 116 to connect the device 110 to a digital appliance 120. There may be only one or a plurality of central processing units 112, as there may optionally be only one or a plurality of system memory 113 or non-volatile storage 114. There may be only one or a plurality of interfaces 116; the invention is not so limited. The non-volatile storage 114 may be included in the CPU 112 or be discrete from the CPU 112; generally, components or sub-components of the DRM device hardware 110 may be combined with other components or subcomponents of the DRM device for higher integration and perhaps lower cost.

The CPU 112 may be a general purpose CPU or a CPU with dedicated functions. Furthermore the CPU 112 may include internal memory, and internal non-volatile storage which in the description of the present invention may serve a similar purpose of the system memory 113, and non-volatile storage 14 respectively. The CPU 112, the non-volatile storage 114, and/or other components may be implemented as a tamper resistant hardware, or sections of the CPU 112, the non-volatile storage 114, and/or other components may be tamper resistant; the invention is not so limited.

The non-volatile storage 114 may be any of several types of storage including semiconductor based media such as read only memory (ROM), electronic erasable programmable read only memory (EEPROM), flash memory or battery backed up random access memory (RAM); or magnetic media storage such as hard disk drive or floppy disk, or the like.

The interface 116 can connect the DRM device 110 with a digital appliance 120 in both physical and communication aspects. The physical aspect can be, for example directly, through one or more cables, and/or wireless. The communication aspect of the interface 116 allows data exchange between the DRM device and the digital appliance. The interface 116 may be any of several types of interfaces, for example PCI, ISA, Universal Serial Bus (USB), FireWire, IDE, SCSI, RS-232 or other serial interface, parallel interface, Compact Flash (CF) interface, Sony Memory Stick interface, Multimedia Card (MMC), secure digital (SD), Bluetooth, Infiniband, and/or any other type of interface that may be used to connect a DRM device with a digital appliance.

The digital appliance 120 is used by an end user for some end use of one or more digital documents. A digital document is data which has an end use of being read by an end user, and at some point prior to end use is stored and/or represented in numerical form. The digital document can have various purposes, for example a corporate purpose such as a sales presentation, a legal contract, a finance spreadsheet, or the like; or an academic purpose, such as an academic book, a published paper, a student class pack reader, or the like; or a commercial purpose, for example a newspaper, a periodical journal, a comics journal, or the like; or the like various purposes that a digital document may have. The digital appliance 120 may be one of several digital appliances such as a personal computer, tablet computers, personal digital assistant (PDA) or other types of hand held devices, cell phones, programmable consumer electronics and the like. End use includes use of the DRM device by an end user to access digital document content. Some examples of tasks which can be performed in connection with accessing the document content include viewing the content of the document or a section of the document, modifying the document, searching the document for a text string, copying parts or all of the document, selecting text within the document to perform an operation on that text, add overlay comments on top of existing content, respond to assignments by adding content to the document or adding content to a matching but separate document, listening to a voice version of the document, printing sections or all of the document, sharing the document with other end users, transferring all or part of the document to other end users, transferring the rights to use the document to other end users, aggregation of several documents or sections of several documents into one or more new documents and other like operations that a user may apply to a digital document. The invention is not so limited.

The non-volatile storage 114 contains instructions which may be executed by the CPU 112. The non-volatile storage 114 further may contain: an optional unique device serial number, a method of authentication such as a unique pair of public and private cryptographic keys and a signed authenticity certificate. The instructions stored in the non volatile storage 114 allow the digital appliance 120 to access a portion of the non volatile storage 114 through the interface 116, but prevent access to another portion of the non volatile storage 114, including a portion that stores the private cryptographic key and a portion that stores instructions that execute in a closed environment without enabling user access. The non-volatile storage may also store a plurality of methods for authentication; the invention is not so limited.

Figure 2:
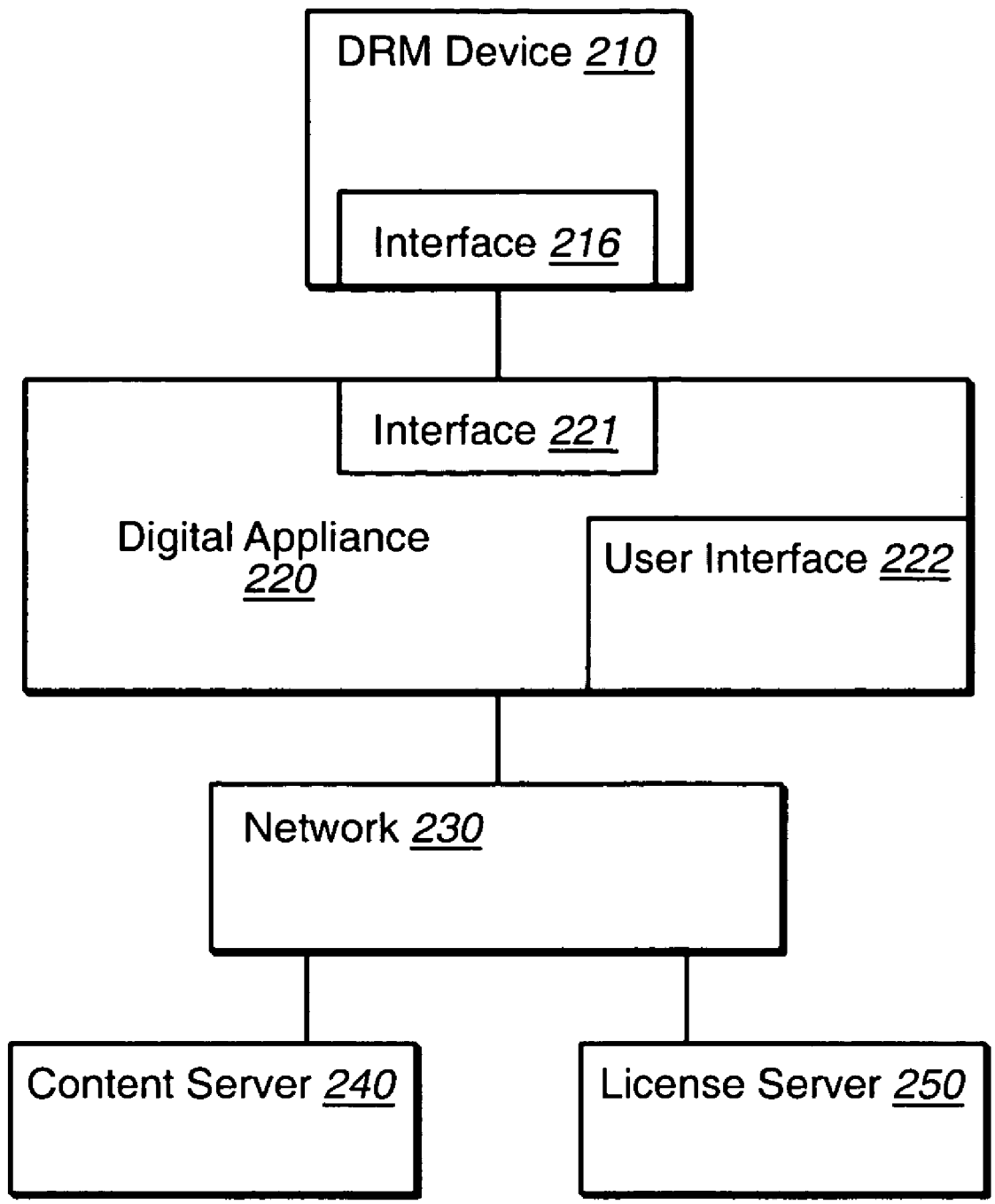
FIG. 2 is a schematic block diagram of an exemplary system.

FIG. 2 is a diagram of an exemplary embodiment of the system which includes a DRM device 210 with an interface 216, a digital appliance 220 with an interface 221 which matches the interface 216 of the DRM device 210, a user interface component 222 on which a processed document may be presented (for example as a visual image, synthesized audio or other form) to the user, the network 230, a content server 240 which is a computer that can transfer digital documents over the network and a license server 250 which is a computer that may transfer authentication and/or decryption and/or policy and/or formatting information over the network. According to one embodiment that information is embedded in one or more files. According to one embodiment the servers are optionally interconnected. The system may include a plurality of DRM devices 210, digital appliances 220, content servers 240 and license servers 250, the invention is not so limited. It may be appreciated by those skilled in the art that the content server 240 and the license server 250 may be implemented as separate or unite hardware and/or software components.

The DRM device 210 (as well as 110 of FIG. 1) can conveniently be implemented in one or more of the flash memory cards or flash drives that are commercially available. Suitable memory cards are those sold under the trademarks Compact-Flash (CF), Multi-Media Card (MMC), Secure Digital (SD), miniSD, TransFlash, Memory Stick and others. Flash drives, including USB type flash drives such as those sold under the Cruzer trademark, can also be used. SanDisk Corporation, the assignee hereof, manufactures and sells these memory cards and flash drives. They are suitable because they have enough processing power to both manage the flash memory and perform the processing indicated in FIGS. 3, 4, and 6 for most applications.

The interface 221 connects the digital appliance 220 with a DRM device 210. The interface 221 may be any of several types that may be used to connect a device with a digital appliance. The interface 221 of the digital appliance matches the type of interface 216 of the DRM device in a form that enables information to pass between the DRM device 210 and the digital appliance 220.

As noted, the device may have multiple such interfaces 221, which may be for a physical connection to the digital appliance, either directly or through a hardware adaptor, a wireless connection, or both. For example, a memory card may have two sets of physical contacts allowing a single card to be compatible with different formats. For example, U.S. patent application Ser. Nos. 29/203,693, 10/826,801, and 10/826,796, all filed Apr. 16, 2004, all of which are hereby incorporated by reference, present a memory card that has two sets of contacts for a first interface compatible with the USB physical interface on one side and a second interface compatible with the SD format on the other side. Examples of memory cards that use a wireless communication channel (R.F., infra-red, Bluetooth, those based on the 802.11 protocol, such as WiFi, and ultra-wideband (UWB) technologies, among others) with the digital appliance are described, for example, in U.S. patent application Ser. No. 10/741,147, filed Dec. 18, 2003, which is also hereby incorporated by reference. In the case of a device with a stand alone wireless arrangement, the device would just need proximity to the digital appliance and can use, for example, an R.F. capability to communicate, with power either supplied externally (from the host or elsewhere) or a battery.

The content server 240 is a computer that can be accessed through a network 230 such as the Internet network. The content server 240 can respond to requests to download content such as digital electronic documents. Examples of content servers can be Amazon.com or another on-line bookseller web site that enables downloading of electronic books to a personal computer, a university web site that enables downloading of electronic versions of articles to a researcher's personal computer, and a corporate web site that enables employees to download corporate documents to their personal computers. A license server 250 is a computer that can be accessed through a network 230 such as the Internet network. A license server 250 can respond to requests to download information such as authentication and/or decryption and/or policy and/or formatting information. This data may include: definition of policies to be used by the DRM device policies, definition of formatting to be used by the DRM device formatters, definition of decryption to be used by the DRM device decryptors, definition of authentication to be used by the DRM device authenticators, parts of the text of the electronic document or parts of the electronic document, information regarding the user, information regarding the rights of the user to one or more end uses (the user may have access to all possible end uses or less than all possible end uses) of the document or part of the document, information regarding the vendor/owner/operator of the system, information regarding the specific DRM device, and other information. The information may be utilized by the DRM device or the digital appliance while the user makes use of the content or in preparation to enable the user to make use of the content or any additional information. According to one embodiment the content server 240 and the license server 250 are implemented as separate entities that interconnect through a network and do not directly interconnect. According to another embodiment the servers directly interconnect. According to another embodiment the content server 240 and the license server 250 are implemented as a single entity. The invention is not so limited.

An authenticator implemented in a DRM device participates in the process of authenticating the DRM device to a remote server over a network. An authenticator may implement one of several methods of authentication including sending a device ID number to the remote server. Another authenticator uses an encryption secret key known only to the device and the server, and bases the authentication on challenging the device in order to verify that it has possession of the secret key. In an exemplary embodiment of such an authentication process the server sends an encrypted message to the device, and the authenticator at least decrypts the message and returns it to the server. In some embodiments, the same key can be used in a variety of methods to authenticate, for example, by signing a plaintext message and/or decrypting an encrypted message. In some embodiments, the authenticator responds to challenges by performing a series of operations such as decrypt a message, process the result, encrypt the result, and return it to the server for verification. For this authentication process to occur, the secret key may be stored in the device prior to the authentication process. The stored key can be a single key stored equally on all devices or a dedicated key unique to each device. In the latter case the server should know in advance which key is stored within which device. Another method to authenticate uses a public and private key and a digital certificate. In such an embodiment, the authenticator has access to a private key and a matching public key stored in the device The private key must be kept secret, but the public key may be made public. The server may then challenge the authenticator with a message encrypted with the device public key to ensure it has access to the matching private key. In some embodiments, the authenticator signs a message but does not necessarily encrypt the message. Optionally the server can receive from the device a digital certificate, which contains device identification information such as the device serial number or device ID and/or the public key of the device and/or additional information relating to the device, the server, the organization operating the system or any other information. The device identification information is digitally signed by a trusted authority, such as the vendor of the device, owner of the server, the organization operating the system and/or another trusted authority to form a digital certificate for that device. Some embodiments of the authenticator can authenticate the DRM device and/or a user of the DRM device.

A decryptor in the device participates in the process of transforming encrypted documents or sections of documents into a decrypted form. A decryptor may implement one or more of several methods: symmetric algorithms such as DES, 3DES, AES, and IDEA; and/or asymmetric algorithms such as RSA, Diffie-Hellman, elliptic curve; and/or others. A decryptor may implement one or a plurality of decryption methods. A decryptor may include hashing algorithms such as DSA, MD2, MD4, MD5, HMAC and/or SHA1 and/or others to retrieve a signature and check origin and integrity of the data received. The decryption key or plurality of decryption keys for such operations may originate in one or a plurality of sources. For example, decryption key data can be stored in the non-volatile storage of the DRM device, received from the digital appliance, and/or received from a network server, such as through the digital appliance. Some embodiments receive digital document content which is at least partly decrypted. In such embodiments, obviously the decryptor may or may not process the already decrypted portion. The decryptor can at least partly decrypt—for example, fully decrypt part of a document, and/or perform one or more decryption steps, which can be the complete decryption process or a subset of the complete decryption process, for a whole or part of the document. In some embodiments, the document can be received at least partly as plaintext—in other words, received as at least partly unencrypted.

A policy in the device participates in the process of verifying the eligibility of end use of a document or a section of a document, allowing or disallowing operations such as decrypting, formatting, searching, and/or transmitting an output to the digital appliance. The verification may check one or several eligibility options, including the right to use the document, the right to use the document up to a certain date, the right to use the document between certain dates, the right to use the document after a certain date, the right to use the document for a certain accumulated usage time, the right to use the document for a certain number of times, the right to transfer the document, the right to modify the document, the right to add overlay information on the document, the right to save the document into the device and/or another location, the right to save the overlay information into the device and/or another location, the right to copy the document, the right to copy portions of the document, the right to copy specific sections of the document, and other rights related to an end user in connection with an end use of the document. These might be checked by the policy to produce a result that might be one or more possible actions such as allowing the output to be transmitted to the digital appliance, disallowing the output from being transmitted to the digital appliance, erasing the document or part of the document, and/or allowing or disallowing operations such as search, cut, paste, copy, edit, save, and other operations that a user may perform while in an end use of the document.

A formatter defines a process step in formatting a document into a presentable form. A formatter may do one or more formatting operations including: selecting the section of the document to be presented; conversion of the text, graphics and images to a single or set of digital images in one of many formats such as a bitmap image (BMP) or like form or compressed image such as JPEG, TIFF, GIF; or any other like form; setting spaces between characters and letters according to the required display form; searching the text for a particular text string; generating the layout of the document; drawing the text characters in the appropriate font and font size; and other operations performed in the preparation and conversion of a document into a presentable form. Some embodiments of a formatter degrade at least part of the document. Some embodiments arrange a presentation of the digital document content by presenting visual and/or audio information, such as presenting a voice version of the document.

In the example of a digital document, the formatter can produce a formatted form of the digital document or the section of the digital document, such as, but not limited to, a bitmap image of a page of the document. Other examples of formatting include passing plain text to the digital appliance. Consequently, although the digital document is stored in non-volatile storage in a form where its information content is accessible, once it is formatted for presentation on the digital appliance, it is in a form where the information content is not directly accessible. For instance, by rendering the digital document as one or more pages, each as a bitmap, the information content cannot be directly accessed, meaning that it can not be searched or otherwise manipulated, as it is only a list of values for the various pixels, each pixel having an equal amount of data assigned. Under this arrangement, the document can still be, for example, searched in response to a request from host, but the search would be performed by the CPU on the device on the document within the hidden portion of the non-volatile memory. By transferring the document in only this presentation format (or its equivalent) to the digital appliance, the security of the content stored on the device is corresponding increased. As also noted above, the formatter can also degrade the document, thereby only providing a further "reduced" version outside of the secure portion of the non-volatile storage. More generally, not all of the content of a given page need be reduced or otherwise limited into a form where the information content is not directly accessible, but, according to a principle aspect of the present invention, at least a portion of the rendered page transferred to the host will reduced in this manner to increase security for the document.

The digital document is provided to the digital appliance rendered into a presentation format, such as a bitmap, or more generally as a presentation equivalent format, such as a compressed version of the bitmap, to reduce the amount of data transfer. In some cases, the transfer to the digital appliance may include some metadata as well as bitmap; for example, if the document includes an image (or fragments of an image) that is transferred in, say, JPEG format, the metadata could provide layout information on how to place the image. (It should be noted that the term bitmap is being used not only to describe a file in the *.BMP format, but more generally to describe the information on the values for the various pixels in presentation. This may be the BMP format or other graphical representations for images, such as a JPEG that decompresses to a bit map.)

In the case of a document having content with video, audio, or both, the content would be presented in a unit of presentation at a time; for example, video data could be transferred on a frame-by-frame basis. Thus, to pirate the video would require the capture the each decompressed frame individually, which is a very large amount of data, particularly for video that is normally stored and transferred in compressed form, which is significantly smaller. The use of various aspects of the present invention for video data, audio data, or both is described further in an U.S. patent application entitled "Protection of Digital Data Content", by Gidon Elazar, Dan Harkabi, Nehemiah Weingarten, Avraham Halachmi, Noam Camiel, and Eran Fuchs filed Feb. 2, 2005 which is hereby incorporated by reference.

When rendered into its presentation equivalent format, the digital document will typically have multiple pages, although smaller documents may be only single page. The presentation equivalent format may also be rendered as a single page in the case where it is rendered into a form having the appearance of a web-based html-type page or equivalent format. For example, the document, or part of the document, and any accompanying metadata may be rendered into a form of html or tag language that is more compact for transfer to the digital appliance that can transformed later for an html presentation on a browser. The application of various aspects of the present internet-type web pages is described further in U.S. patent application Ser. No. 10/827,267, filed Apr. 20, 2004, and published under no. 2004/0210433A1 on Oct. 21, 2004, which is hereby incorporated by reference. In the case of a web-based html-type page, at least a part of the text portion can again be rendered as a bitmap (or compressed bitmap) to increase content security. It should be noted that when the digital document is rendered into pages, the pagination or other editorial details need not be the same as in print equivalent versions of the same document as the document can be formatted according to the display requirements of particular digital appliances.

When the presentation equivalent format of the digital document has multiple pages, the exemplary embodiment provides the rendered pages to the digital appliance on a page-by-page basis. This can further increase security as only a single page at a time is accessible outside of the hidden memory area of the DRM device. A digital document may be pre-rendered into presentation equivalent format and stored, for example on a page-by-page basis as a bitmap in a file in the hidden area of the memory, to be fully available upon request by the digital appliance. Alternately, some or all of the rendered image may be stored outside of the hidden area, a chunk of the document being rendered, transferred to the host, then rendering another chunk, and so on as this may increase performance. Alternately, individual pages can be rendered in response to specific requests for them from the digital appliance. The performance of this last arrangement can be improved by using look ahead caching, where, based on the requested page, pages likely to be requested next are determined and the DRM device pre-renders these. The look ahead caching can be a device side implementation (where the device determines pages likely to be requested next, pre-renders, and caches them), a host side implementation, where the host requests additional pages based on a request and caches them), or a combination of these.

Figure 3:
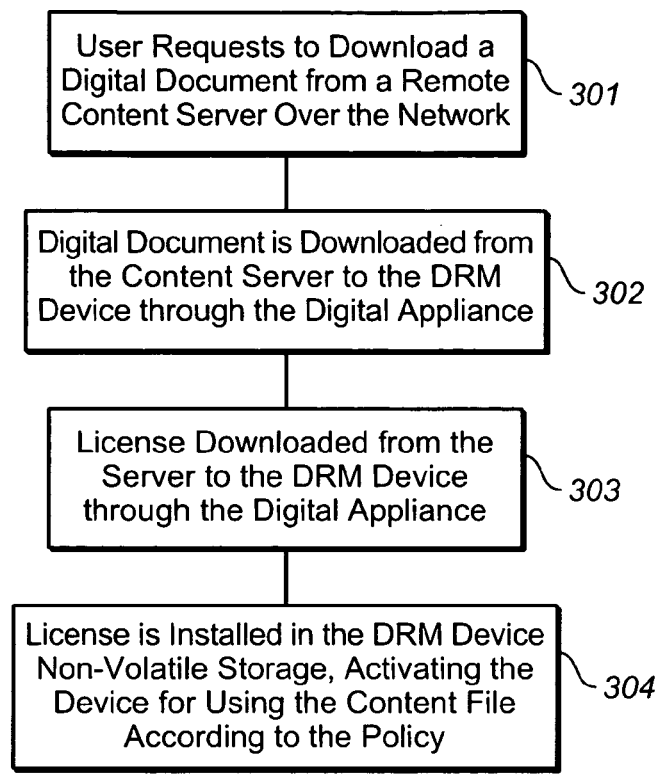
FIG. 3 is a flowchart of an exemplary method for delivering a digital document file using the system of FIG. 2.

FIG. 3 is a flow chart describing an exemplary sequence of operations carried out when a user downloads content from a network server. In step 301 one or more users request a digital document to be downloaded to the DRM device that is connected to the digital appliance. Typically following step 301, the server drives a phase of proving the eligibility of the user to receive the document. User eligibility to receive the content is determined by the server, following rules such as payment, free for use, user authentication, registration or other similar methods that may be used by a user to prove eligibility or to become eligible to receive the document. Once the server is ready to download the content, it sends the content through the network to the digital appliance that is attached to the network. The content may be encrypted or parts of it may be encrypted. According to one embodiment the DRM device must be presently attached to the digital appliance at the time of transmission. According to another embodiment the DRM device does not necessarily have to be attached at the time of transmission of the document and can be made present later when the document is to be used. At step 302 the document is transmitted from the network server (depicted as content server) to the digital appliance and from the digital appliance to the DRM device. According to one embodiment the document is completely transferred to the digital appliance before being transferred to the DRM device. According to another embodiment the document is transferred in sections, where each section is transferred to the DRM device at its own pace. On step 303 the license is transferred from the network server (depicted as license server) to the digital appliance and from the digital appliance to the DRM device. The license can be one or more files. The license contains information used by the policy, authenticator, decryptor, and/or formatter in the DRM device. According to another embodiment the license server and the content sever are implemented as a single server. According to another embodiment the license is embedded in the document to form a single file transferred from a single server. It may be appreciated by those skilled in the art that there exist other methods to sequence the transfer process with the result of having the document or part of the document and the license transferred to the DRM device. Step 304 describes the installation of the license in the non-volatile storage of the DRM device. Once installed in the DRM device, the license may activate the usage of the document according to the rights defined in the license. According to one embodiment the activation is performed immediately following the installation process. According to another embodiment the activation is performed in a later timeframe, such as at the time of usage of the document.

Figure 4:
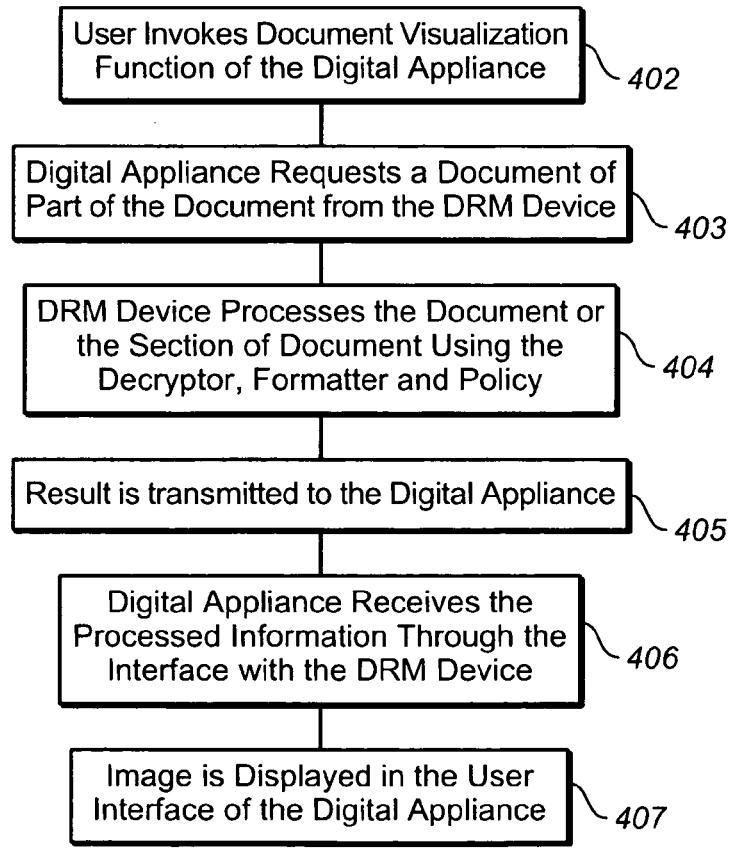
FIG. 4 is a flowchart of an exemplary method for using the digital document file of FIG. 3.

FIG. 4 is a flow chart describing an exemplary sequence of operations for using a document for visualization. In step 402 the user invokes a document usage function in the digital appliance. In step 403 the digital appliance further sends requests to the DRM device. In step 404 the DRM device processes the request by performing a sequence of operations, optionally involving one or more decryptors, one or more formatters, and one or more policies on the document or part of the document, before transferring the result to the digital appliance in step 405. According to another embodiment, part or all of the operations that involve the decryptors, formatters and/or policies is performed before the request from the digital appliance is received. The order of the operations of the decryptors, formatters and policies can be altered and executed in any sequence. The invention is not so limited.

FIG. 4 is a flow chart describing an exemplary sequence of operations for using a document for visualization. In step 402 the user invokes a document usage function in the digital appliance. In step 403 the digital appliance further sends requests to the DRM device. In step 404 the DRM device processes the request by performing a sequence of operations, optionally involving one or more decryptors, one or more formatters, and one or more policies on the document or part of the document, before transferring the result to the digital appliance in step 405. According to another embodiment, part or all of the operations that involve the decryptors, formatters and/or policies is performed before the request from the digital appliance is received. The order and existence of the operations of the decryptors, formatters and policies can be altered and can occur in any sequence. The invention is not so limited.

More specifically, the request of step 403 can be for either an entire document or a portion it; for example, a particular page may be requested. At step 404, the document or portion of it is rendered into presentation format (or its equivalent), such as a bitmap. If device-side based look ahead caching is used, additional content may be rendered and cached based on this request. Note that if portions of the document, or the document as a whole, has been pre-rendered, step 404 would precede step 403.

In step 405, only the presentation-formatted version (or its equivalent) of the document is sent to the appliance. For example, a compressed bitmap of a single page of the document is transmitted. Any extra processing, such as decompressing the bitmap of a page, can be included in step 406. The ability to perform any needed process can be part of an application on the digital appliance. The application can be stored on the user accessible part of the non-volatile memory, received from a server at registration or at update, or a combination of these or other sources. The image of the requested page or portion of the document is then displayed at step 407. Subsequent pages or other parts of the document can then be requested, taking the process back to step 403. If a host-side implementation of look ahead caching is used, these subsequent pages may be requested by the digital appliance based on the request in preceding step 403 and produced when the application is idle (while the currently displayed page is read by the user).

Figure 5:
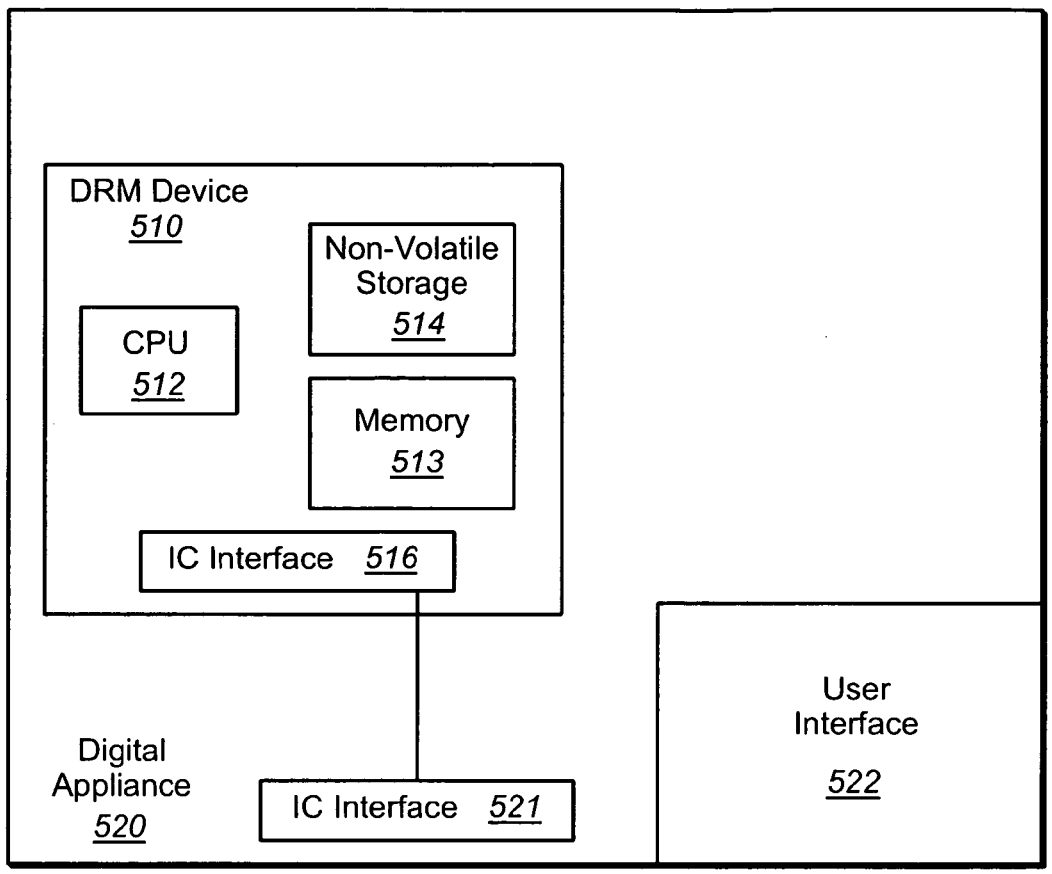
FIG. 5 is a schematic block diagram of another exemplary system.

FIG. 5 is a diagram of another exemplary embodiment of the system which includes a DRM device 510 with an IC interface 516, a digital appliance 520 with an IC interface 521 which matches the IC interface 516 of the DRM device 510, and a user interface component 522 on which a processed document may be presented (for example as a visual image, synthesized audio or other form) to the user. One example of the DRM device 510 is an integrated circuit executing instructions. The DRM device 510 can be included in the digital appliance 520. In some embodiments the code or data can be stored inside the non-volatile storage of the DRM device IC, and/or can be in storage external to the DRM device IC. The DRM device IC can execute independently from a processor of the digital appliance.

Figure 6:
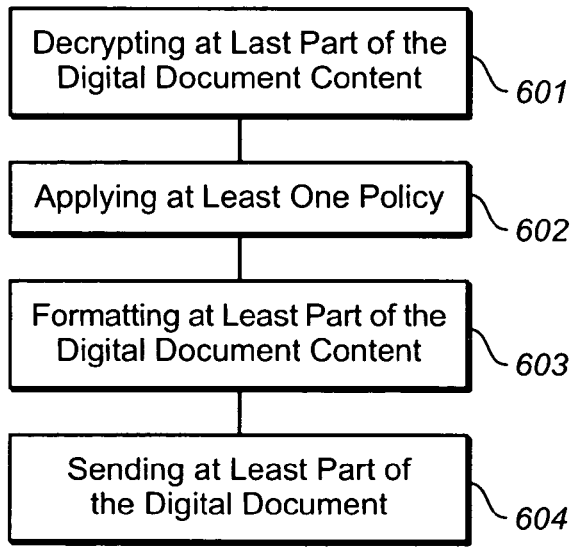
FIG. 6 is a flowchart of another exemplary method for using the digital document file of FIG. 3.

FIG. 6 is a flow chart describing another exemplary sequence of operations for using a document for visualization. In step 601, at least part of the digital document content is decrypted. In step 602, at least one policy is applied. In step 603, at least part of the digital document content is formatted. In step 604, at least part of the digital document is sent. The order and existence of the operations can be altered and can occur in any sequence.

Many of the comments made above with respect to FIG. 4 also apply to FIG. 6. In step 603, when the content is formatted, it is rendered into the presentation format (or its equivalent) for the digital appliance. For example, it can formatted as a number of pages each presented as a bitmap, where the information content of each page is not directly accessible in this form. The formatting can be done in real time, in response to the request for a particular page or portion of the content, or the content can be pre-rendered. To avoid storing large amounts of pre-rendered data, but increase performance, look-ahead caching can be used based on requests. In step 604, the presentation equivalent format of the document, for instance a single page as a bitmap, possibly in compressed form, is sent. As the information content of this is not directly accessible, and the digital appliance cannot otherwise directly access this information content, as it is stored on the device, the security of the content is increased. If more of the document, for example another page, a request is again sent from the digital appliance, although, as discussed above, a number of presentation format images (as in frames of video or audio content) may be sent based on a single request.

The invention claimed is:

1. A digital content management device adapted to be selectively linked with a digital appliance for end use of a digital document, comprising:
   a nonvolatile storage section configured to store the digital document, wherein the digital document is stored in a form where content of the digital document is accessible within the digital content management device, wherein the nonvolatile storage section includes a first portion that is accessible by the digital appliance and a second portion that is inaccessible by the digital appliance, the digital document being stored in the second portion;
   a controller configured to:
      send authentication information to an external server via the digital appliance in order authenticate the digital content management device,
      render the stored digital document into a presentation equivalent format for the digital appliance, and
      send the digital document only in the presentation equivalent format to the digital appliance, wherein at least a portion of the content of the digital document is not accessible to the digital appliance in said presentation equivalent format; and
   an interface configured to:
      selectively link with the digital appliance and communicate at least part of the digital document to the digital appliance in the presentation equivalent format, and
      receive the digital document from the digital appliance in response to authentication of the digital content management device to the external server,
   wherein the digital document is accessible to the digital appliance only in the presentation equivalent format.

2. The digital content management device of claim 1, wherein at least a portion of said presentation equivalent format is a bitmap image.

3. The digital content management device of claim 1, wherein at least a portion of said presentation equivalent format is a compressed bitmap image.

4. The digital content management device of claim 1, wherein the digital content management device is a non-volatile memory card.

5. The digital content management device of claim 4, wherein said non-volatile memory card is compatible with at least a CompactFlash format.

6. The digital content management device of claim 4, wherein said non-volatile memory card is compatible with at least a Secure Digital format.

7. The digital content management device of claim 4, wherein said non-volatile memory card is compatible with at least a Multi-Media Card format.

8. The digital content management device of claim 4, wherein said non-volatile memory card is compatible within at least a Memory Stick format.

9. The digital content management device of claim 4, wherein said non-volatile memory card is compatible with at least a TransFlash format.

10. The digital content management device of claim 1, wherein the digital content management device is a Universal Serial Bus (USB) flash drive type device.

11. The digital content management device of claim 1, wherein the removably and operatively couples the digital management device with the digital appliance.

12. The digital content management device of claim 1, wherein said interface uses a wireless communication channel to selectively link with the digital appliance.

13. The digital content management device of claim 1, wherein said presentation equivalent format appears in a format of a web page, at least a portion of which is a bitmap image.

14. The digital content management device of claim 1, wherein the presentation equivalent format comprises a plurality of pages, each of which corresponds to less than all of the digital document.

15. The digital content management device of claim 14, wherein one or more of said pages are rendered prior to receiving a request therefor from the digital appliance.

16. The digital content management device of claim 14, wherein individual ones of said pages are rendered in response to receiving a request therefor from the digital appliance.

17. The digital content management device of claim 16, wherein based on said request, one or more additional ones of said pages are also rendered prior to receiving a request therefor.

18. The digital content management device of claim 1, wherein the controller is further configured to:
in response to a request from the digital appliance, search for the information content of the digital document.

19. The digital content management device of claim 1, wherein the presentation equivalent format is a degraded version of the digital document.

20. The digital content management device of claim 1, wherein the digital document comprises video data; and
wherein the controller is configured to decompress the video data and to send the decompressed video data to the digital appliance via the interface.

21. The digital content management device of claim 20, wherein the controller is configured to send the decompressed video data frame-by-frame.

22. A method of supplying a digital document from a digital content management device adapted to be selectively linked with a digital appliance for end use, comprising:
sending authentication information to an external server via the digital appliance in order authenticate the digital content management device;
in response to authentication of the digital content management device to the external server, receiving the digital document from the digital appliance;
storing in a nonvolatile storage section on the digital content management device the digital document in a form where the content of the digital document is accessible within the digital content management device, wherein the nonvolatile storage section includes a first portion that is accessible by the digital appliance and a second portion that is inaccessible by the digital appliance, the digital document being stored in the second portion;
rendering the stored form of the digital document into a presentation equivalent format for the digital appliance, wherein at least a portion of the information content of the digital document is not accessible to the digital appliance in said presentation equivalent format; and
sending the at least part of the digital document to the digital appliance in the presentation equivalent format, wherein the digital document is accessible to the digital appliance only in the presentation equivalent format.

23. The method of claim 22, wherein at least a portion of said presentation equivalent format is a bitmap image.

24. The method of claim 22, wherein at least a portion of said presentation equivalent format is a compressed bitmap image.

25. The method of claim 22, wherein said at least part of the digital document is sent to the digital appliance in the presentation equivalent format using at least a Universal Serial Bus (USB) type protocol.

26. The method of claim 22, wherein said at least part of the digital document is sent to the digital appliance in the presentation equivalent format using at least a secure digital (SD) type protocol.

27. The method of claim 22, wherein said at least part of the digital document is sent to the digital appliance in the presentation equivalent format using at least a Compact Flash (CF) type protocol.

28. The method of claim 22, wherein said at least part of the digital document is sent to the digital appliance in the presentation equivalent format using at least a TransFlash type protocol.

29. The method of claim 22, wherein said at least part of the digital document is sent to the digital appliance in the presentation equivalent format using at least a Memory Stick type protocol.

30. The method of claim 22, wherein said at least part of the digital document is sent to the digital appliance in the presentation equivalent format using at least a wireless communication channel with the digital appliance.

31. The method of claim 22, wherein said at least part of the digital document is sent to the digital appliance in the presentation equivalent format using at least an 802.11 based protocol.

32. The method of claim 22, wherein said at least part of the digital document is sent to the digital appliance in the presentation equivalent format using at least a SCSI type protocol.

33. The method of claim 22, wherein said at least part of the digital document is sent to the digital appliance in the presentation equivalent format using a PCI type protocol.

34. The method of claim 22, wherein said presentation equivalent format appears in a format of a web page, at least a portion of which is a bitmap image.

35. The method of claim 22, wherein the presentation equivalent format comprises a plurality of pages, each of which corresponds to less than all of the digital document.

36. The method of claim 35, wherein one or more of said pages are rendered prior to receiving a request therefor from the digital appliance.

37. The method of claim 35, wherein individual ones of said pages are rendered in response to receiving a request therefor from the digital appliance.

38. The method of claim 37, wherein based on said request, one or more additional ones of said pages are also rendered prior to receiving a request therefor.

39. The method of claim 22, further comprising:
in response to a request from the digital appliance, searching the information content of digital document on the device.

40. The method of claim 22, wherein the presentation equivalent format is a degraded version of the digital document.

41. The method of claim 22, wherein the digital document comprises video data;
further comprising decompressing the video data; and
wherein sending the at least part of the digital document includes sending the decompressed video data to the digital appliance via the interface.

42. The method of claim 41, wherein sending the decompressed video data comprises sending the decompressed video data frame-by-frame.

\* \* \* \* \*

UNITED STATES PATENT AND TRADEMARK OFFICE
CERTIFICATE OF CORRECTION

PATENT NO. : 7,979,700 B2  
APPLICATION NO. : 11/067298  
DATED : July 12, 2011  
INVENTOR(S) : Elazar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this
Twenty-second Day of November, 2011

David J. Kappos
*Director of the United States Patent and Trademark Office*